Sept. 10, 1935.  A. LA F. MAULDIN  2,014,337
WIND WHEEL
Filed Sept. 6, 1934  2 Sheets-Sheet 1

A. L. Mauldin, INVENTOR
BY Victor J. Evans & Co.
ATTORNEY

Sept. 10, 1935. A. LA F. MAULDIN 2,014,337
WIND WHEEL
Filed Sept. 6, 1934 2 Sheets-Sheet 2

A. L. Mauldin, INVENTOR
BY Victor J. Evans & Co.
ATTORNEY

Patented Sept. 10, 1935

2,014,337

UNITED STATES PATENT OFFICE 2,014,337

WIND WHEEL

Alney La Fayette Mauldin, Edna, Tex.

Application September 6, 1934, Serial No. 742,966

3 Claims. (Cl. 170—23)

This invention relates to windwheels and has for its object the provision of a motor of novel construction by which the power of the wind will be utilized in a highly efficient manner. It is also an object of the invention to provide a windwheel in which the blades will be mounted in a novel and efficient manner to utilize the force of the blades through the greater part of their travel and to feather as they turn against the wind. The several objects of the invention are attained in such an apparatus as is illustrated in the accompanying drawings, and the invention resides in certain novel features which will be particularly defined in the claims following a detailed description.

Figure 2:
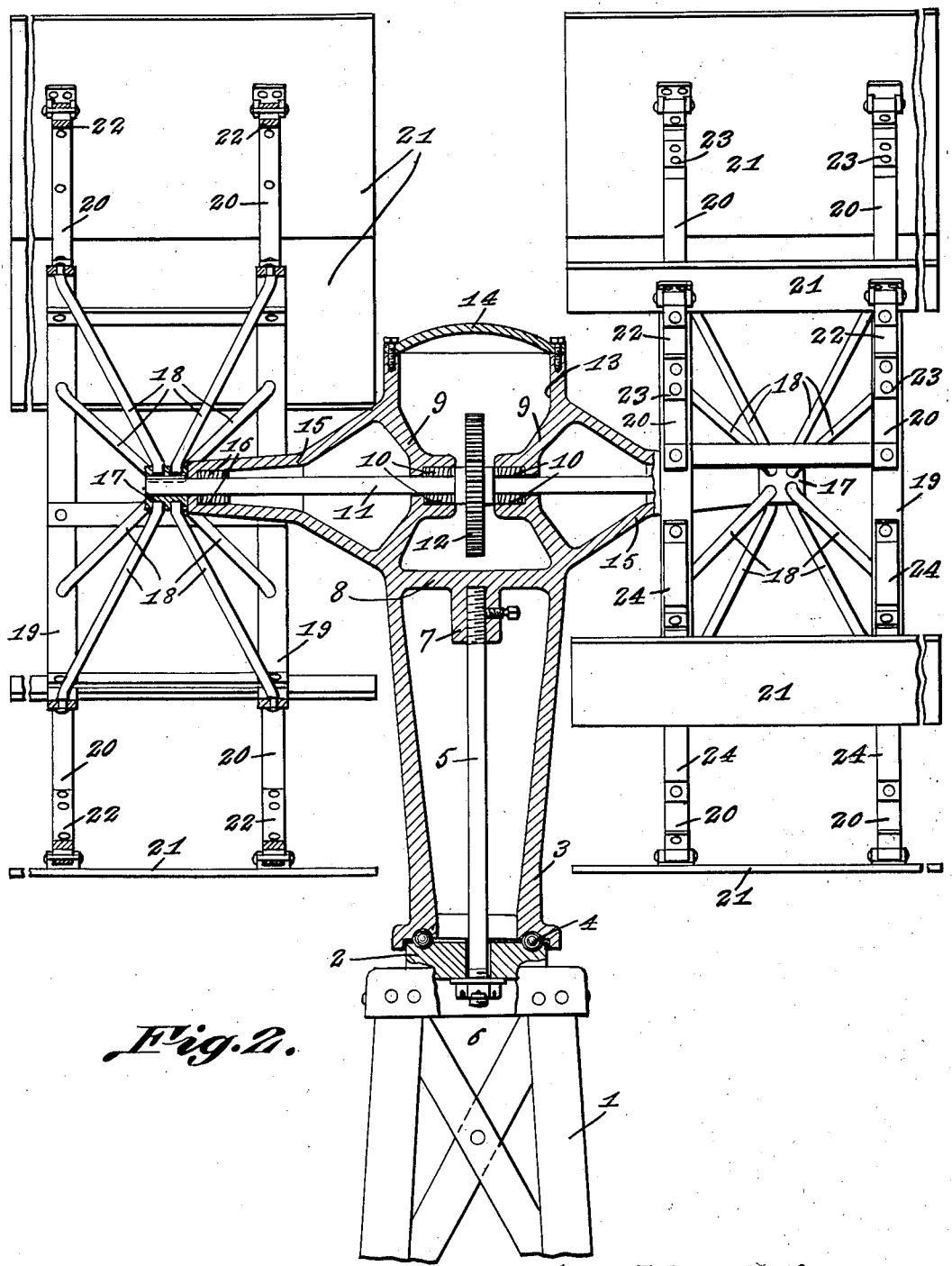
Figure 2 is a side elevation with parts in section.

In practicing the present invention, there is provided a derrick or tower 1 which may be of any approved construction and upon the top of which is a table 2 supporting a hollow post 3, an antifriction step bearing 4 being interposed between the table and the post as shown. A retaining rod 5 is disposed axially within the post and has a lower threaded end inserted through a central opening in the table 2 and equipped with a nut 6 adapted to be turned home against the under side of the table. The upper end of the rod is secured in a boss or socket 7 on the under side of a partition 8 at or near the upper end of the post so that when the nut is turned home, the post will be held firmly on the derrick but may rotate readily about its vertical axis. Above the horizontal partition 8 are vertical partitions 9 which support bearings 10 for the shaft 11 which is equipped with a gear wheel or pulley 12 from which power may be taken in any convenient manner. The partitions 9 form parts of a housing 13 for the shaft 11 and said housing is hollow, as shown in Figure 2, to contain a lubricant for the shaft bearings, a cover 14 for the housing being provided to exclude dust. The housing is preferably integral with the post, and it is constructed with arms 15 through which the shaft extends, bearings 16 being provided in the ends of the arms.

Figure 1:
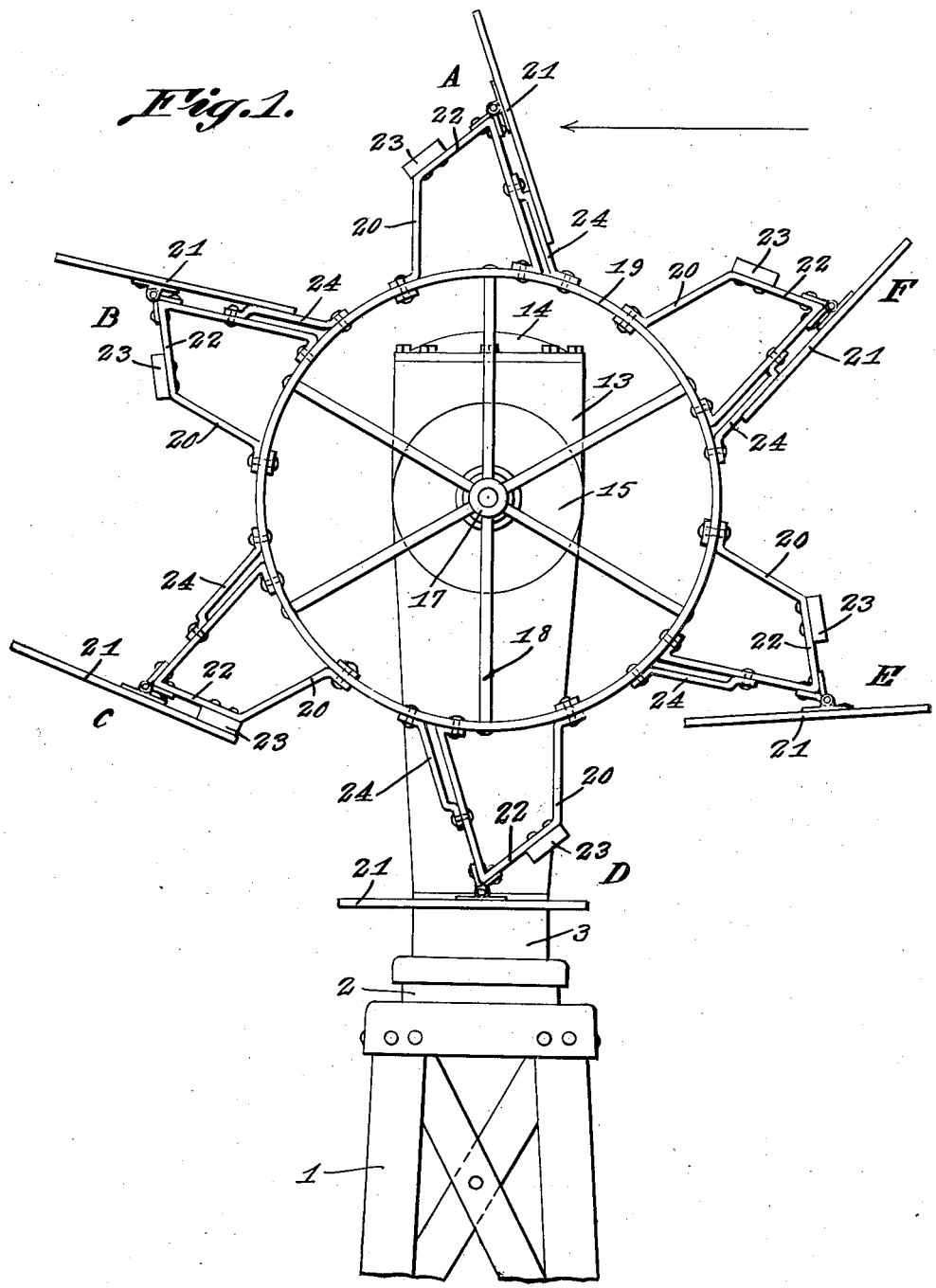
Figure 1 is an end elevation of a windwheel embodying the invention.

On the ends of the shaft, immediately adjacent the ends of the arms, hubs 17 are secured, and spokes 18 diverge from the hubs to rims 19 which are disposed in pairs, one rim of each pair being located in a vertical plane between the ends of the associated arm while the other rim is in a vertical plane beyond the outer end of the arm, the hub being midway the two planes. At intervals around the rims, brackets 20 are secured thereto, six brackets being shown although any desired number may be employed within the capacity of the rims. The brackets are open frames of substantially triangular form, as shown in Figure 1, and at the apexes of the triangles, the blades 21 are mounted, it being noted that each blade is hinged to two brackets and is parallel with the shaft. The forward side of each bracket, in the direction of rotation of the wheel, is bent, to provide an outer inclined portion 22 and a cushion or buffer 23 of rubber or other suitable material is fixed upon the portion 22 for disposal in the path of the blade to soften the impact thereof. At the rear side of the bracket, a brace 24 is secured thereto and to the rim to reenforce the bracket and to aid in withstanding the rough usage to which the bracket is subjected. It will be noted upon reference to Figure 1 that the blades are hinged to the brackets nearer one edge so that each blade has, in effect, a leading minor arm and a trailing major arm.

The operation will be readily understood. The arrow in Figure 1 represents the direction of the wind and the drum or wheel will rotate counter-clockwise. It will be noted that the uppermost blade, at the point A, is resting against the brace and is receiving the full force of the wind on its face to effect turning of the wheel. This relation of the parts will continue as the blade approaches the station B, the force of the wind upon the blade, however, diminishing as the blade recedes from the vertical position. As the blade passes from the station B and below a horizontal plane, the back of the blade will be presented to the wind and the blade will be quickly reversed and the shorter arm of the blade will be caused to rest on the buffer 23 as at station C, the wind then acting with propelling force on the back of the blade. As the blade approaches the lowest point of its travel, its edge will gradually be presented to the wind so that it will be neutral and will not exert any driving force upon the wheel but, at station D, the blade will be horizontal and relatively at rest. As the blade passes on the upward part of its orbit, its face will gradually be again presented to the wind, as at stations E and F, the entire face being in the wind at the latter station although not squarely presented thereto. It will thus be seen that each blade is active in imparting power to the wheel through approximately three-fourths of the rotation of the wheel so that an appreciable degree of power will be developed whenever the wind is strong enough to move the wheel at all. By having a wheel on each end of the shaft, the machine is nicely balanced so that it will run easily at all times, and by mounting the post on an antifriction bearing it may be easily turned so as to present the faces of the blades to the wind. Any convenient means for putting the wheel into or out of the wind may be employed.

Having described the invention, what I claim is:

1. A wind motor comprising a shaft, hubs on the shafts, coaxial rims connected to the hubs, rigid brackets fixed on the rims, buffers on the leading sides of the brackets, and blades hinged to the brackets at the juncture of the leading and trailing sides thereof and adapted at times to rest upon the buffers.

2. A wind motor comprising a shaft, hubs on the shaft, coaxial rims carried by the hubs, rigid brackets fixed on the rims and projecting therefrom in the plane of the rims, braces secured to the rims and to the trailing sides of the brackets respectively and blades hinged to and spanning the brackets and adapted at times to rest against either the braces or the opposite sides of the brackets.

3. A wind motor comprising a rotatable post, a housing on the upper end of the post and projecting at opposite sides thereof, a shaft journaled in and extending longitudinally through the housing, hubs secured on the ends of the shaft, a pair of coaxial rims for each hub, spokes diverging from the hubs to the rims, rigid brackets fixed on the rims in parallel pairs and projecting therefrom in the planes of the rims, outer inclined portions for each bracket, a buffer secured to each outer inclined portion and blades hinged upon the brackets at the outer ends of the inclined portions and spanning parallel brackets, the blades extending parallel with the shaft and at right angles to the brackets and adapted to alternately rest upon the buffers and the opposite sides of the brackets respectively.

ALNEY LA FAYETTE MAULDIN.